April 9, 1946.  B. F. AMBROSIO  2,397,909
DOT AND DASH TELEGRAPH RECEIVER
Filed Dec. 14, 1944  7 Sheets-Sheet 1
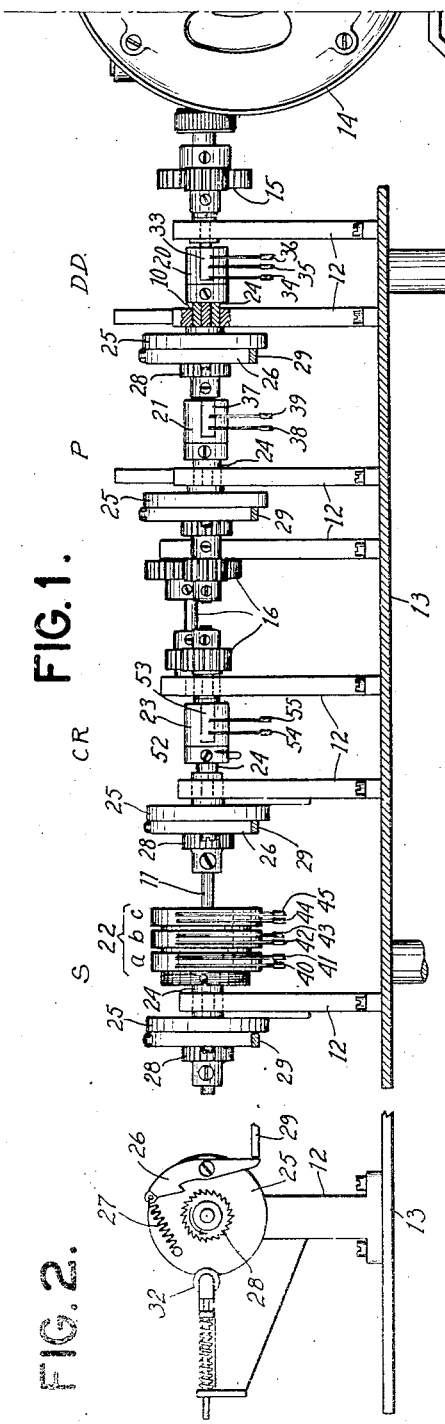
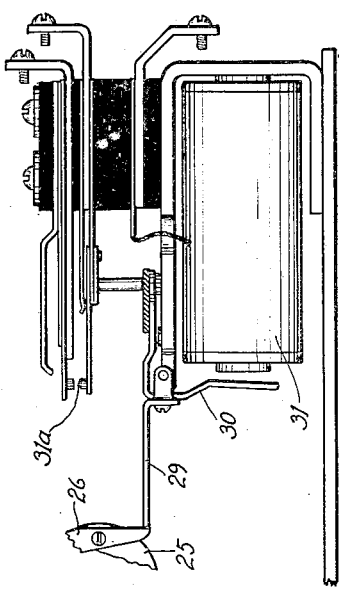
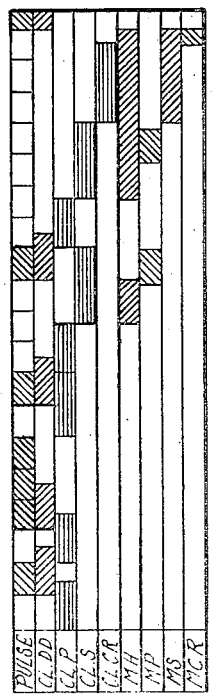
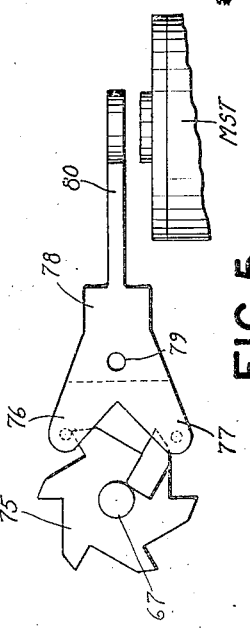
INVENTOR
Biagio F. Ambrosio
BY
ATTORNEY April 9, 1946.  B. F. AMBROSIO  2,397,909
DOT AND DASH TELEGRAPH RECEIVER
Filed Dec. 14, 1944  7 Sheets-Sheet 2

INVENTOR
Birgis F. Ambrosio
BY
W. M. Wilson
ATTORNEY

April 9, 1946. B. F. AMBROSIO 2,397,909
DOT AND DASH TELEGRAPH RECEIVER
Filed Dec. 14, 1944 7 Sheets-Sheet 3

INVENTOR
Biagio F. Ambrosio
BY
ATTORNEY

April 9, 1946.    B. F. AMBROSIO    2,397,909
DOT AND DASH TELEGRAPH RECEIVER
Filed Dec. 14, 1944    7 Sheets-Sheet 4

INVENTOR
Biagio F. Ambrosio
BY
W. M. Wilson
ATTORNEY

April 9, 1946.　　　B. F. AMBROSIO　　　2,397,909
DOT AND DASH TELEGRAPH RECEIVER
Filed Dec. 14, 1944　　　7 Sheets-Sheet 7

INVENTOR
Biagio F. Ambrosio
BY
ATTORNEY

Patented Apr. 9, 1946

2,397,909

UNITED STATES PATENT OFFICE 2,397,909

DOT-AND-DASH TELEGRAPH RECEIVER

Biagio F. Ambrosio, Long Island City, N. Y., assignor to International Business Machines Corporation, New York, N. Y., a corporation of New York Application December 14, 1944, Serial No. 568,107

14 Claims. (Cl. 178—26)

This invention relates to a telegraphic recording machine. Its primary object is to provide an improved machine for making a printed record of messages sent in a code composed of successively transmitted marking signal elements of different time values, separated by spacing signal elements. This type of code is referred to herein as a "dot-dash" code.

It is a particular object of the invention to provide a machine of this kind which is reliable in operation and not subject to disturbances by extraneous influences.

Another object is to provide a mechanism operating in response to dot-dash code signals to control the permutation bar mechanism of a telegraph printer.

Another object is to provide a mechanism of the kind described which is self regulating to conform to the rate of transmission.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a vertical sectional view showing the comparative timing mechanism in side elevation.

Fig. 2 is an end elevation of the timing mechanism, seen from the left.

Fig. 3 is a detail elevation of a clutch and contact operating magnet.

Fig. 4 is a time diagram illustrating the manner in which dots, dashes, and spaces of different length are distinguished.

Fig. 5 is a detail view of the distributor escapement.

Figure 7:
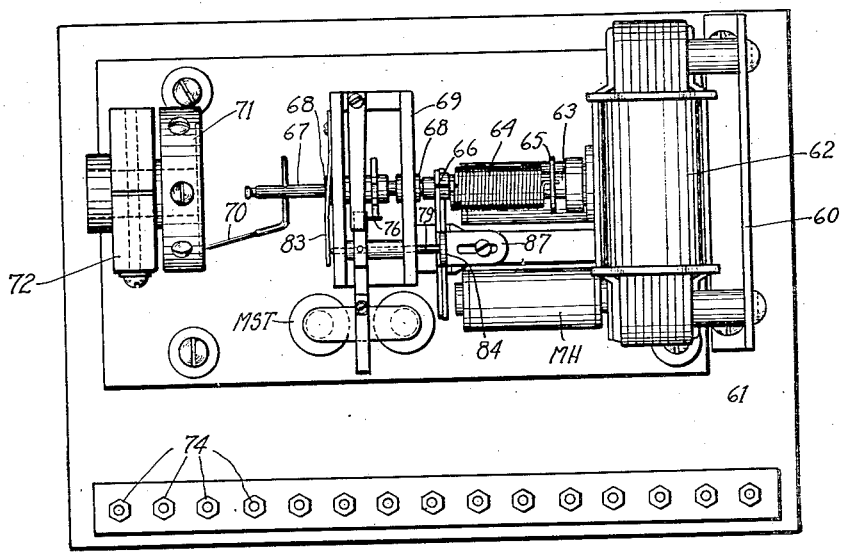
Fig. 7 is a plan view of the distributor.
Figure 6:
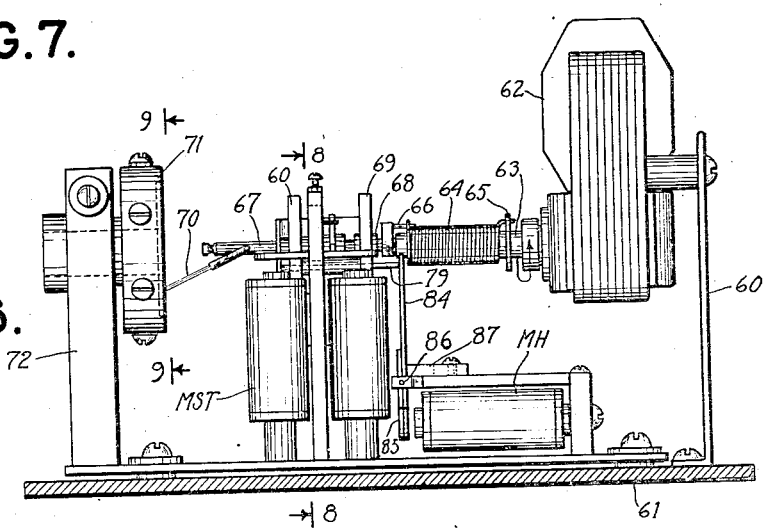
Fig. 6 is a vertical sectional view showing the distributor in side elevation.
Figure 8:
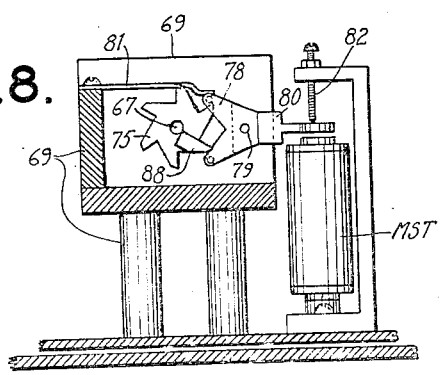
Fig. 8 is a vertical section on the line 8—8 of Fig. 6.

The invention is exemplified by an apparatus adapted to be controlled by Morse code signals. This code is composed of marking signal elements having different time values, called dots and dashes, separated by spacing signal elements. If the dot is taken as having the basic time value $t$, the dash has a time value $3t$. A space between signal elements representing a single letter has the value $t$, while a space between letters has the value $3t$, a space between words $5t$, and a space calling for carriage return $7t$ or more. While the speed of sending may vary, these relations remain substantially constant.

The printer is controlled by a set of signal storing devices which are made ready in pairs during the reception of successive signal elements representing a single character, one or the other storage device of each pair being operated, in dependence upon whether the signal element to be stored is a dot or a dash. The selection is controlled by comparing incoming signal elements with a fixed time measuring device, which is started the instant a marking condition of the line begins. If the marking condition ends before the fixed time ends, the dot storing device is operated while, if the fixed time ends first, the dash storing device of the pair is operated. In a similar way spacing line conditions are compared with fixed time measuring devices which are set in operation successively while the spacing condition continues. If the first of the latter timing devices completes its time measuring function before the spacing condition ends, the printer is caused to operate, printing the character determined by the signal elements stored at the time. If the second of the space condition measuring devices completes its timing function before the spacing condition ends, it operates the space bar of the printer, indicating the end of a word. If the third spacing condition timing device completes its timing function before the spacing condition ends, it causes the carriage return key of the printer to be operated.

Timing devices

The timing devices are shown in Figs. 1–3. Two timing shafts 10 and 11 are rotatably mounted upon bearing supports 12 secured to a base plate 13. The shaft 10 is driven by a motor 14 through gearing 15. The shaft 10 is geared to the shaft 11 by a reducing gearing 16 which causes the latter shaft to rotate in the same direction as the former, but at a speed ratio of 3:5.

There are four timing devices, identified generally as DD, the "dot-dash" timing device, P, the "print" timing device, S, the "space" timing device, and CR, the "carriage return" timing device. The timing device DD is for comparison with marking signal elements, to differentiate dots (1t) from dashes (3t). The timing device P is for comparison with spacing signal elements to differentiate spaces (1t) between signal elements of a single letter from the longer spaces (3t) between letters, which call for printing of the letter represented by the stored signal elements. The timing device S is for comparison with a spacing condition continuing after the timing device P has completed ts function, to determine whether the total space is long enough (5t) to indicate the end of a word, which would call for the operation of the space bar of the printer. The timing device CR is for comparison with a spacing condition continuing after the timing device S has completed its function, to determine whether the total space is long enough (7t) to indicate the end of a line, which would call for the operation of the carriage return key of the printer.

Each timing device comprises a commutator, 20, 21, 22, or 23, secured to a sleeve 24 which is revolubly mounted on the shaft 10 or 11 and is revolubly carried in the related bearing support 12. At the left end of each sleeve is fixed a clutch disk 25 having pivoted to it (Fig. 2) a clutch dog 26 urged by a spring 27 toward engagement with a ratchet wheel 28 fixed to the shaft 10 or 11. The dog 26 is normally held disengaged by an arm 29 secured to the armature 30 (Fig. 3) of a clutch magnet 31. When the clutch magnet is momentarily energized, the dog is released and engages the ratchet wheel, setting the clutch disk and the related commutator in rotation. The clutch magnet is deenergized shortly, as will be explained presently, and the arm 29 returns to position to disengage the clutch dog at the end of one revolution, at which time a spring operated detent roller 32 enters a notch in the clutch disk to hold the latter in normal position.

The armature 30 also closes a pair of contacts 31a when the magnet 31 is energized.

The commutator 20 of the dot-dash timing device has a strip of insulation 33 on its periphery, the rest of its surface being conductive. (See also Fig. 10, where the commutators are shown as developed surfaces. In this figure the space timing commutators are arranged in the order in which they are set in operation, rather than according to their location on the shafts.) There are three brushes, 34, 35, and 36, bearing on the insulating strip 33 in the normal position of the commutator 20. The commutator 21 has a conductive strip 37 on which two brushes 38 and 39 bear in the normal position of the commutator, its surface being of insulating material except for the strip 37. The commutator 22 is in three mutually insulated sections, 22a, b, c each having two brushes 40, 41; 42, 43; 44, 45; bearing on it. Section a has a conductive strip 46 (Fig. 10) and insulation 47; section b has an insulating strip 48 and a conductive portion 49; section c has a conductive strip 50 and insulation 51. The commutator 23 has insulation 52 and a conductive strip 53 on which brushes 54 and 55 bear in the normal position of the commutator.

Distributor

The distributor for preparing the pairs of storage devices successively to receive the incoming signal elements is shown in Figs. 5–9. Upon a bracket 60 secured to a base plate 61 is mounted a stall motor 62, that is, a motor which can exert a constant torque on its shaft while the latter remains stationary, or turns slowly. Surrounding the shaft 63 of this motor is a coil spring 64, the right end of which is anchored to a flange 65 on the motor shaft. The left end of the spring is hooked over a crank pin 66 of the distributor shaft 67 rotatably mounted in bearings 68 in the vertical walls of a support 69. Near its left end the distributor shaft 67 carries a brush 70 which bears upon a contact disk 71 mounted on a support 72. The contact disk has six contacts, a, b, c, d, e, f (Fig. 9), each of which is electrically connected to a terminal screw 73. These terminal screws are connected by wires (not shown) to binding posts 74 which can be conveniently connected to certain relay contacts to be referred to presently in the description of the circuit diagram.

The rotation of the distributor shaft is controlled by an escapement mechanism. Fixed to the shaft is an escapement wheel 75 coacting with two pins 76 and 77 mounted on an arm 78 attached to a shaft 79 pivotally supported in bearings in the vertical walls of the support 69. The opposite end of the arm 78 is fixed to an armature 80 actuated by a stepping magnet MST. When the stepping magnet is energized, the arm is rocked clockwise (Figs. 5 and 8) against the action of a spring 81, allowing a tooth of the wheel 75 to slip past the upper pin 76, under the influence of spring 64, while another tooth is caught by the lower pin 77, after a half step rotation of the distributor shaft. When the stepping magnet is deenergized, the arm 78 is rocked back by the spring 81, the pin 77 releases the escapement wheel, and the pin 76 stops the next tooth of the escapement wheel behind the one which it previously held. The normal position of the upper pin is determined by a set screw 82 forming a stop for the armature 80.

In addition to the step-by-step movement just described, the distributor shaft may have a free movement to home position. For this purpose the shaft 79 of the arm 78 is slidable in its bearings in the support 69 and can be moved to the left, against the action of a spring 83, by an arm 84 fixed to the armature 85 of a homing magnet MH. The armature is pivoted at 86 and is stopped by an abutment 87 adjustably attached to the frame of the homing magnet. The ratchet wheel 75 has a tang 88 making one of its teeth broader than the others. When the shaft 79 is moved to the left by the energization of the homing magnet MH, the upper pin 76 is moved to the left clear of all the teeth of the ratchet wheel except the broad tooth 88. Thus, the distributor shaft revolves under the influence of the spring 64 until the broad tooth strikes the upper pin 76, the lower tooth 77 being at this time beyond the circle described by the extremities of all the teeth.

Figure 9:
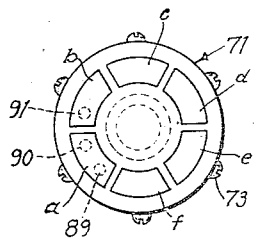
Fig. 9 is a vertical section on the line 9—9 of Fig. 6.

When the distributor shaft 67 is stopped in the home position, after the homing magnet has been energized, the brush 70 bears upon the first contact a of the distributor disk at the spot indicated by the dotted line circle 89 in Fig. 9. When the stepping magnet MST is energized, the brush moves to the spot indicated by the dotted circle 90. When the stepping magnet is deenergized, the brush moves to a spot indicated by the dotted line circle 91 on the second contact segment b. Thus the brush does not leave a contact segment until the stepping magnet is deenergized.

Printer

Figure 14:
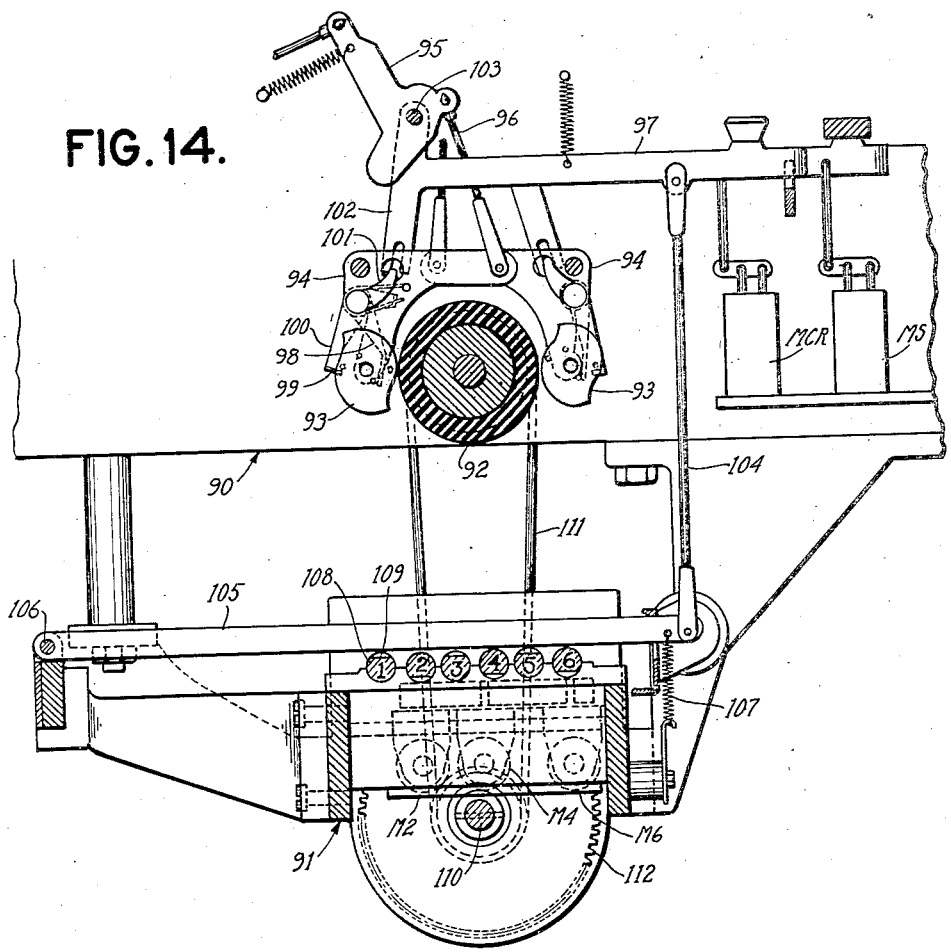
Fig. 14 is a simplified vertical sectional view of the printer used in the first embodiment.
Figure 15:
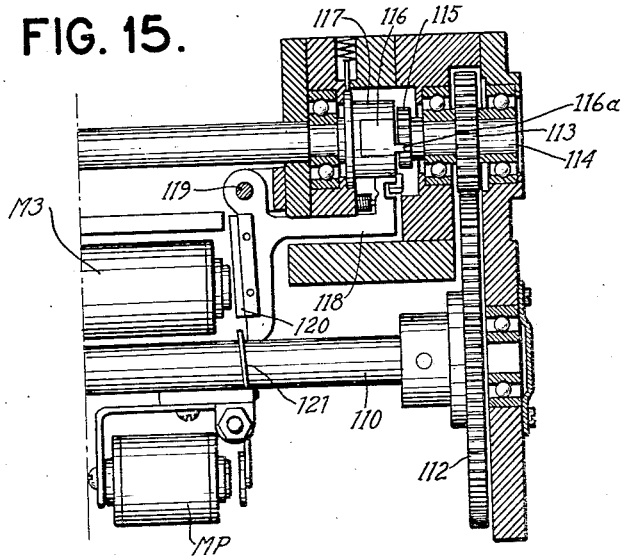
Fig. 15 is a detail view of part of the control mechanism of the permutation bar mechanism of the printer shown in Fig. 14.

The printer is shown in Figs. 14 and 15 and is similar to the one disclosed in Patents 2,165,247 and 2,278,981. The machine comprises a typewriter 90, of the type disclosed in Patent 1,936,466, and a permutation bar control mechanism 91 for operating its keys. The type bars (not shown) are actuated by a power driven roller 92. A cam 93 is provided for each type bar and each cam is journaled on one arm of a related bell crank lever 94 pivoted in the frame, the other arm of the bell crank lever being operatively connected with one arm of a related bell crank lever 95 by means of a link 96. The other arm of lever 95 is connected to the related type bar (not shown) in well known manner (see Patent 1,936,466).

The lever 94 is actuated by the cam 93 when the latter is made to engage the driven roller 92 by operation of a related key lever 97. The cam 93 is engaged by a spring pressed arm 98 which tends to turn it into contact with the roller 92, but is normally restrained by a stop 99 on a lever 100 pivoted on the bell crank 94, which stop normally stands in the path of a lug on the cam. When the lever 100 swings to move its stop out of the path of the lug, the arm 98 swings the cam into engagement with the power roller, to be actuated thereby, to swing the bell crank 94 to actuate its connected mechanism.

The lever 100 has an arm 101 which is provided with an offset projection at its end, which projects laterally through an opening in the bell crank lever 94 and between the tangs of the bifurcated lower end of an arm 102 of the key lever 97 pivoted on the common rod 103. Depression of the key lever will rock the lever 100 and release the cam 93 as described.

Each key lever 97 is connected by a link 104 to a related control lever 105 pivoted on a common rod 106 and urged downward by a spring 107 against a set of six revoluble permutation bars 108, bearing the individual numbers 1, 2, 3, 4, 5, 6. In line with the control lever 105 the permutation bars have slots 109, the slots on the bars 1, 3, and 5 being on the top side, while those on the shaft 2, 4, and 6 are on the bottom side. If the bars 2, 4, and 6 are revolved while the bars 1, 3, and 5 remain stationary, all the bars will present slots to the particular control lever 105 shown in Fig. 14, which will therefore rock downward under the influence of the spring 107, actuating the related key lever 97. The arrangement of the slots 109 aligned with each of the control levers 105 is different, as more fully disclosed in Patent 2,165,247, so that by rotating different combinations of the permutation bars 108 different keys will be actuated.

The driving and control means for the selective rotation of the permutation bars has the construction disclosed in Patent 2,278,981, Fig. 2 of which is duplicated herein as Fig. 15. Under the permutation bars is a drive shaft 110 driven by a belt 111 from the power roller 92. The shaft 110 has a driving gear 112 at each end meshing with a gear 113 fixed to a short shaft 114. The shafts 114 at opposite ends of the permutation bars are journaled concentrically to different intermediately positioned permutation bars 3 and 4, respectively, and their gears 113 mesh with similar gears (not shown) on short shafts journaled concentrically to alternately positioned permutation bars; that is, the short shafts concentric to permutation bars 1 and 5 are geared to the short shaft concentric to the permutation bar 3, at one end, while at the other end the short shafts concentric to the permutation bars 2, 4, and 6 are similarly geared together.

Each short shaft 114 has on its inner end a ratchet toothed drive wheel 115 positioned to be engaged by a tooth 116a on a sliding dog 116 of a clutch 117 mounted on the end of the related permutation bar. The engagement of the tooth 116a is controlled by a bell crank lever 118 pivoted at 119 and having an armature 120 attached thereto operated by a selector magnet, the magnet appearing in Fig. 15 being M3. The bell crank 118 can be rocked in the opposite direction by an arm 121 attached to the armature of a magnet MP. For constructional reasons fully disclosed in Patent 2,278,981 it requires a clockwise, then a counterclockwise movement of the bell crank 118 to release the dog 116 of the clutch 117 for engagement of the tooth 116a with the ratchet wheel 115 for a full revolution thereby. These movements are imparted to the bell crank by the successive energization of the magnets M3 and MP, in a manner to be described presently. There are six selector magnets M1–M6, one for each permutation bar, but only two print magnets MP, one for each group of three selector magnets.

Operation

The operation of the apparatus will now be described by reference to the circuit diagram, Fig. 10, and the timing diagram, Fig. 4. The upper line of the timing diagram, marked "pulse," represents the following marking and spacing signal elements: dot, dash, dot, letter space, dot, word space and carriage return. The timing shaft motor 14, the distributor motor 62, and the printer motor 129 are supplied with current from a D. C. supply +, −, when the switch 130 is closed, through positive wire 131, and wires 128, 127; 126, 125; and 124, 123, respectively, to the negative wire 134. When the switch 130 is closed the line relay R9 is assumed to be deenergized, due to a spacing condition of the line. This is indicated by the first rectangle in the line representing the P clutch 25 (CL. P.) in the timing diagram. At this time a circuit extends from positive wire 131, through the normally closed contacts R9a, wire 132, normally closed contacts R11a of relay R11, magnet M11 and wire 133 to the negative wire 134, energizing said magnet. The P clutch is released and the commutator 21 begins to revolve, moving its insulation immediately under the two brushes, 38, 39. The contacts M11a (corresponding to contacts 31a in Fig. 3) are closed by the armature of magnet M11, completing a circuit from the wire 132, through said contacts, relay R11 and wire 133 to the negative wire 134. The contacts R11a b of relay R11 transfer, completing a holding circuit for said relay and breaking the circuit of the magnet M11, the armature of which returns to the normal position in which it will stop the P clutch after one revolution. The contacts R11c close, but without immediate effect because the contacts 38, 39 are on an insulating portion of the commutator.

In accordance with the example, it is assumed that a marking pulse arrives before the commutator 21 completes its revolution. The line relay R9 is thereby energized and its contacts R9a, b transfer, breaking the holding circuit of relay R11 whose contacts R11a, b and R11c return to normal position. The energization of the line relay R9 completes a circuit through its contacts R9b through normally closed contacts R10a, magnet M10 and wire 135 to the negative wire 134, energizing said magnet. The DD clutch is released and the commutator 20 begins to revolve. When the insulating strip 33 moves from under the three brushes 34, 35, 36 the following circuits are completed immediately: from the positive wire 131, through contacts R9b, dot-dash relay RDD, brush 34, commutator 20, brush 36, wire 136, to the negative wire 134; also from the positive wire 131 through fixed time relay RFX, brush 35, commutator 20, brush 36, wire 136, to the negative wire 134. The relays RDD and RFX are thus energized simultaneously and transfer their contacts RDDa—e and RFXa—e at the same instant. No circuit is completed by this simultaneous transfer of the contacts.

Meanwhile, the contacts M10a closes, completing a circuit from the positive wire 131, through the contacts R9b, said contacts M10a, relay R10 and wire 135 to the negative wire. The contacts R10a, b transfer, completing a holding circuit for the relay R10 and breaking the circuit of the magnet M10, which allows the clutch dog releasing arm 29 to return to normal position, whereby the DD clutch will be released after on revolution. The contacts R10c close, completing a holding circuit for relay RDD which by-passes the commutator 20 and allows the relay RDD to remain energized as long as the line relay R9 remains energized.

In accordance with the example, the marking pulse, being a dot, terminates before the DD clutch completes its revolution, whereby the relay RDD is deenergized before the relay RFX. The contacts RDDa—e transfer back to normal position, completing the following circuit: from the positive wire 131, through wire 137, contacts RFXe in transferred position, wire 138, contacts RDDe in normal position, stepping relay RST and stepping magnet MST in parallel, to the negative wire 134. The stepping magnet MST allows the distributor brush to step forward on the first segment a of the distributor disk, but without leaving the segment. The contacts RSTa—d close, completing the following circuit: from positive wire 131, through wire 137, relay R1B, wire 139, contacts RFXa in transferred position, contacts RSTa, now closed, contacts RDDa in normal position, wire 140, distributor segment a, distributor brush 70, and wire 141 to the negative wire 134. The storage relay R1B is thereby energized, closing its holding contacts R1Ba to complete a holding circuit from the relay, through said contacts, wire 142, brush 42, commutator section 22b, brush 43, wire 143 to the negative wire 134.

When the commutator 20 completes its revolution and is stopped in home position, the insulating strip 33 of the commutator moves under the brushes 35, 36, breaking the circuit of relay RFX, which is thereby deenergized. The contacts RFXa—e return to normal position, breaking the previously traced circuit through relay RST and stepping magnet MST. The distributor brush 70 then moves to the second contact segment b of the distributor 71.

The return of the contacts R9a to normal closed position at the end of the first marking pulse completed the previously traced circuit through magnet M11 and caused the P clutch to be released and the relay R11 to be energized as previously described. Once again, in accordance with the example, the next marking impulse begins before the commutator 21 completes its revolution and the relay R11 is deenergized by the breaking of its circuit when the contacts R9a open. At the same time the previously traced circuit through the magnet M10 is again completed and the DD clutch is released and the relay R10 energized as before. The relays RDD and RFX are simultaneously energized and their contacts again transfer to the left simultaneously. In accordance with the example, relay R9 remains energized until after the commutator 20 completes its revolution, hence this time the relay RFX is the first to be deenergized. The contacts RFXa—e return to normal position, completing the following circuit: from positive wire 131, through wire 137, contacts RDDe in transferred position, wire 138, contacts RFXe in normal position, relay RST and magnet MST in parallel, to the negative wire, energizing said relay and said magnet. The distributor brush 70 steps forward on the second distributor segment b, but does not leave it. The contacts RSTa—d close, completing the following circuit: from the positive wire 131, through wire 137, relay R2A, wire 144, contacts RDDb in transferred position, contacts RSTb, now closed, contacts RFXb in normal position, wire 145, distributor segment b, brush 70 and wire 141 to the negative wire 134, energizing said relay. The contacts R2Aa close, completing a holding circuit similar to the one previously traced for relay R1B. When the second marking pulse ends, the relay R9 is deenergized, its contacts R9b open and the relays RDD and R10 are deenergized. The contacts RDDa—e return to normal position, breaking the circuit of relay RST and the stepping magnet MST. When the stepping magnet is deenergized, the distributor brush 70 steps forward to the third contact segment c.

Figure 11:
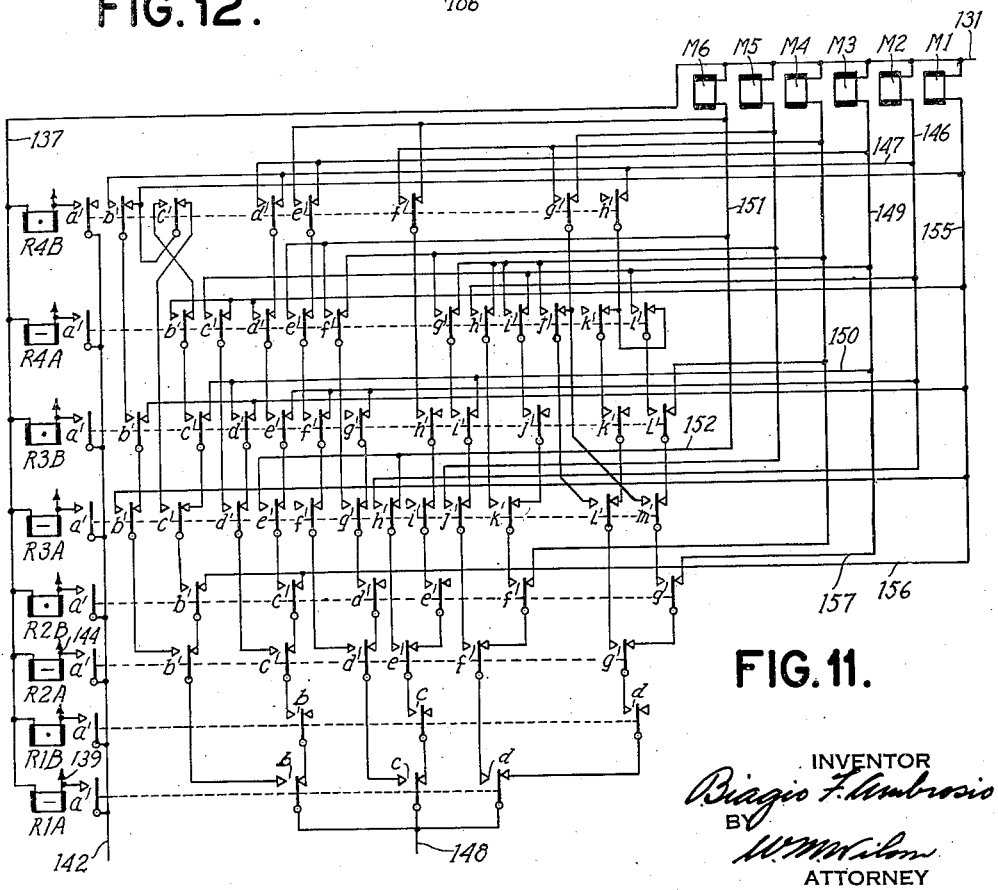
Fig. 11 is a circuit diagram of a relay translator forming part of the apparatus.
Figure 13:
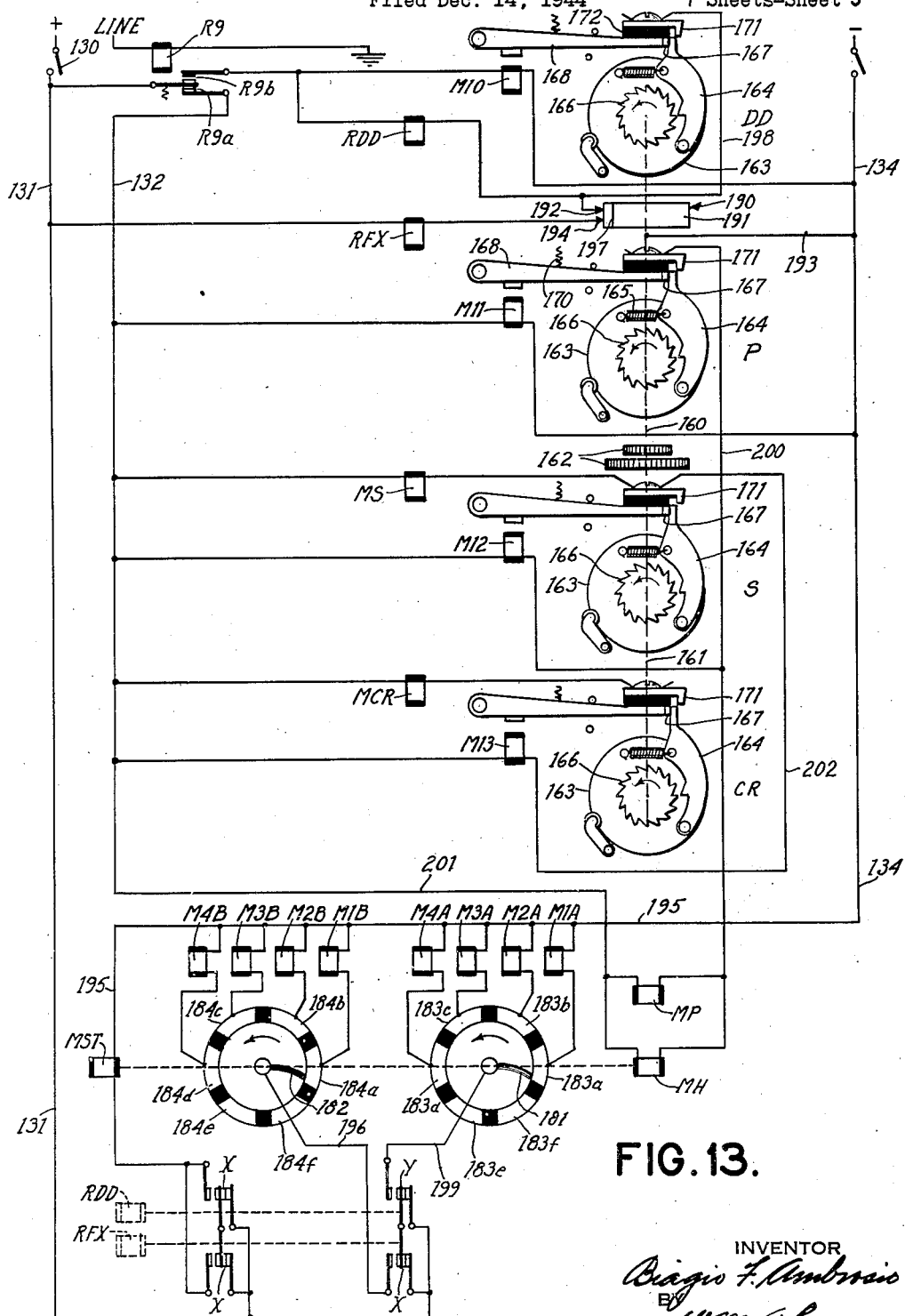
Fig. 13 is a circuit diagram of said modified apparatus.

The same sequences as those previously described occur during the space following the dash just stored and during the storing of the next marking pulse, which the example shows to be a dot. It is evident from the procedure previously explained that the said dot signal element will cause the relay R3B to be energized. Thus, when the space following the third marking signal element begins, there have been stored in the storing relays a dot, a dash, and a dot. Reference to Fig. 11 will show that the following circuits are thereby set up through the contacts of the storage relays to certain ones of the selector magnets M1—M6 of the printer:

1. From the positive wire 131 through selector magnet M2, wires 146, 147, contacts R4Bh and R4Ak in normal position, R3Bk in transferred position, R3Al in normal postion, R2Ag and R1Bd in transferred position, and R1Ad in normal position, to a wire 148 to be referred to later.

2. From the positive wire 131 through selector magnet M3, wires 149, 150, contacts R3Bd in transferred position, R3Ad in normal position, R2Ac and R1Bb in transferred position, and R1Ab in normal position, to wire 148.

3. From positive wire 131 through selector magnet M6, wires 151, 152, contacts R3Ah in normal position, R2Ae and R1Bc in transferred position, and R1Ac in normal position, to wire 148.

Figure 10:
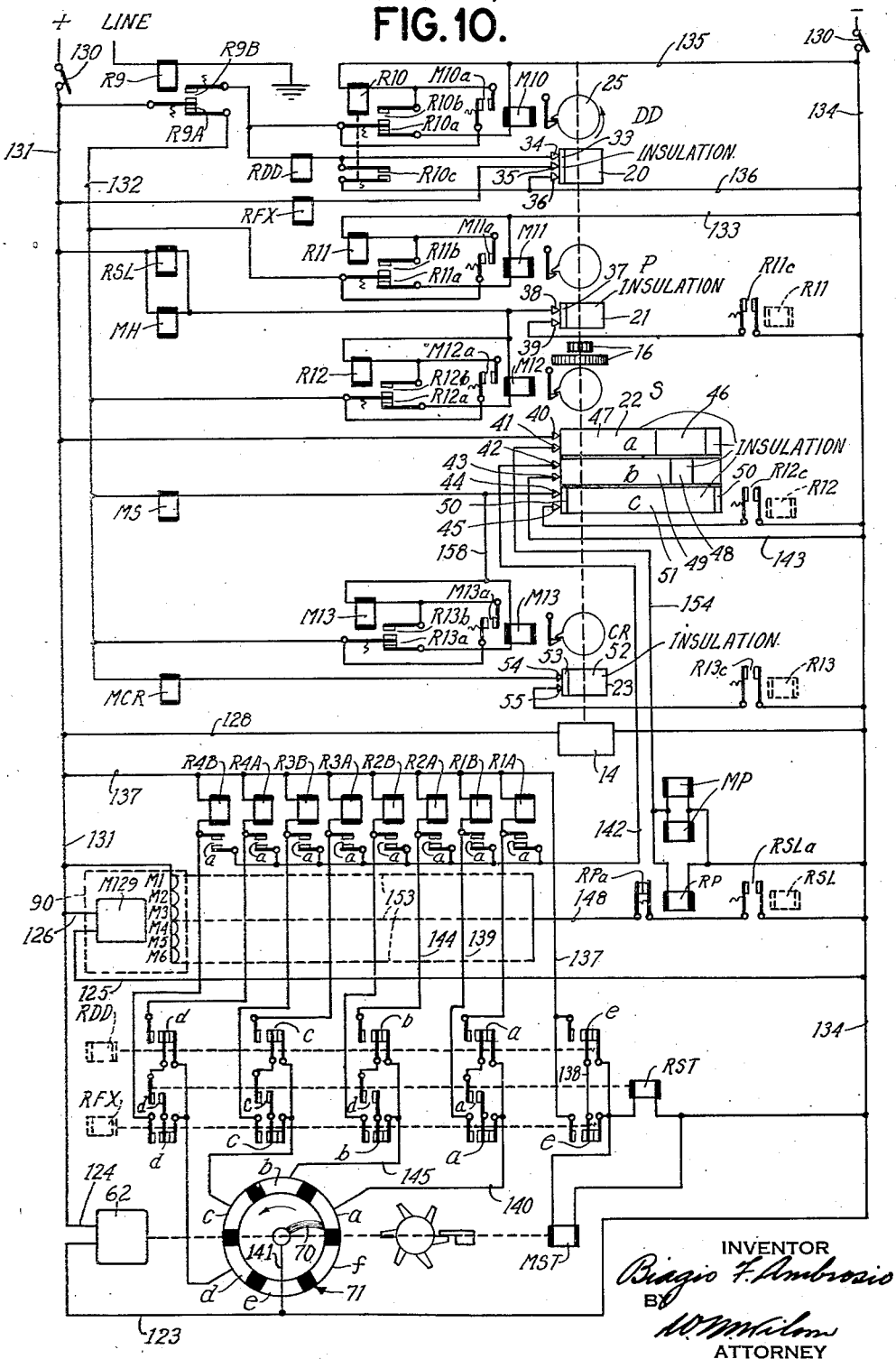
Fig. 10 is a circuit diagram of the apparatus.

The circuits through the storage relay contacts are represented in Fig. 10 by dash lines 153.

When the contacts R9a drop back to normal closed position at the end of the third marking signal element, the magnet M11 is energized through the circuit previously described and the relay R11 is picked up immediately thereafter. This time the spacing condition continues until the commutator 21 has completed its revolution. When the contact strip 37 of the commutator 21 moves under the brushes 38 and 39, circuits are completed from the positive wire 131 through selector relay RSL, and homing magnet MH in parallel, brush 38, commutator strip 37, brush 39, relay contacts R11c, now closed, to the negative wire 134, energizing said relay and said magnet. At the same time a circuit is completed from the negative wire, through contacts R9a, wire 132, normally closed contacts R12a, magnet M12, brush 38, commutator strip 37, brush 39 and contacts R11c, to the negative wire 134, energizing said magnet. The contacts M12a close, completing a circuit from wire 132, through said contacts M12a, relay R12, brush 38, etc., to the negative wire 134, energizing said relay. The contacts R12a, b transfer, completing an obvious holding circuit for the relay R12 and breaking the circuit of magnet M12. The S clutch is released and the commutator 22 begins to revolve.

The energization of the homing magnet MH causes the distributor brush 70 to be restored to the home position, in the manner previously described. The contacts RSLa close, completing circuits from the positive wire 131, the selector magnets M2, M3, and M6, the previously traced circuits 153 through the contacts of the storage relays, wire 148, normally closed contacts RPa and said contacts RSLa, to the negative wire. The selector magnets M2, M3, and M6 are thereby energized preparing a rotation of the related permutation bars of the printer. Due to the construction of the clutch mechanism of these permutation bars, as previously mentioned, the actual rotation does not begin until the print magnets MP are energized. When the commutator 22 has made about a half revolution, the contact segment 46 comes under the brushes 40, 41, completing the following circuit: from the positive wire 131, through brush 40, contact segment 46, brush 41, wire 154, the print magnets MP and relay RP in parallel, to the negative wire 134. The contacts RPa open, deenergizing the selector magnets, to remove current from them promptly. The magnets MP are energized and release the clutches of the permutation bars 2, 3, and 6 for one revolution. As described in Patent 2,165,247, the rotation of these three permutation shafts causes the printer to print the letter "r" corresponding to the Morse signal dot, dash, dot.

Shortly after the print magnet is energized in the manner described, the insulating segment 48 of the middle section of the commutator 22 goes under the brushes 42 and 43 and breaks the holding circuit of the storage relays R1B, R2A, and R3B. The relays are deenergized and their contacts return to normal position.

The next marking signal element is a dot and it begins before the commutator 22 completes its revolution. Contacts R9a open, breaking the holding circuit of relay R12 and allowing the contacts R12b to open and the contacts R12a to close. The dot is stored in the relay R1B in the same manner as the first dot. It is followed by a long space which causes various functions to be performed in sequence, as will now be described.

At the beginning of the space, the contacts R9a return to normal, closed position and the magnet M11 is energized, releasing the P clutch. Also, the relay R11 becomes energized and its contacts R11c close, all as previously described. When the commutator 21 completes its revolution, the relay RSL and the magnets MH and M12 are energized, in the same way as before. The distributor brush 70 returns to home position and the S clutch is released. When the contacts RSLa close, the following circuits are completed through the storage relay contacts:

1. From the positive wire 131, through magnet M1, wires 155 and 156, contacts R2Bc and R2Ac in normal position, R1Bb in transferred position, and R1Ab in normal position, to wire 148.

2. From the positive wire 131, through magnet M3, wires 149, 157, contacts R2Bg, and R2Ag, in normal position, R1Bd in transferred position, and R1Ad in normal position, to wire 148.

When the commutator 22 has completed about half its revolution, the print magnet MP and the relay RP are energized, the former causing the printer to print the character e, since this is the character determined by the rotation of the permutation bars 1 and 3 of the printer. The contacts RPa open to dump the selector magnets M1 and M3. Shortly after, the insulating segment 48 of the middle section b of the commutator 22 breaks the holding circuit of the relay R1B, which becomes deenergized and allows its contacts to return to normal position. This time the spacing condition of the line continues until the commutator 22 has completed its revolution, with the result that the following circuits are established: from the positive wire 131, through contacts R9a, wire 132, the spacing magnet MS, brush 44, the contact segment 50 on the lower section c of the commutator 22, brush 45, contacts R12c, now closed, to the negative wire 134; also, from wire 132, through normally closed contacts R13a, magnet M13, wire 158, brush 44, and thence to the negative wire 134 as previously traced, energizing the magnets MS and M13. The CR clutch is released by the energization of magnet M13 and the commutator 23 begins to revolve. The contacts M13a close, completing a circuit from wire 132, through said contacts, relay R13, wire 158, brush 44, thence to the negative wire as before. Contacts R13b close, completing a holding circuit for relay R13 and contacts R13a open, breaking the circuit of magnet M13.

The magnet MS operates the space bar 159 (Fig. 14) of the printer directly and causes the carriage to escape for one letter space.

When the commutator 23 completes its revolution, the contact segment 53 thereof goes under the brushes 54, 55 and completes a circuit from wire 132 (relay R9 being still deenergized), magnet MCR, brush 54, contact segment 53, brush 55, contacts R13c, now closed, to the negative wire 134, energizing said magnet. The magnet MCR (Fig. 14) operates the carriage return key (not shown) of the printer.

The example shows a marking signal occurring shortly after the energization of the magnet MCR. This marking signal energizes relay R9, transferring the contacts R9a, b to the upper position and breaking the circuits of relays R11, R12, R13 and magnets MS and MCR. The contacts R11c open, breaking the circuits of relay RSL and magnet MH. The apparatus now proceeds in the manner previously described to store and record further signals.

Second embodiment

Another embodiment of the invention is shown in Figs. 12, 13, 16, and 17. The timing devices of this embodiment are, in general, similar to those first described and are, therefore, represented semi-diagrammatically in Fig. 13. There are four timing devices DD, P, S, and CR, mounted on two shafts represented by dotted lines 160 and 161, geared to rotate at 5:3 ratio by gears 162 and driven by a motor (not shown). Each timing device comprises a clutch disk 163 to which is pivoted a clutch dog 164 pulled by a spring 165 toward a driving ratchet 166 fixed to the shaft 160 or 161. The clutch dog is normally held out of engagement with the ratchet wheel by the bent over end 167 (Fig. 17) of a pivoted detent arm 168 coacting with the bent over end 169 of the clutch dog. The detent arms 168 are held up by springs 170, until drawn down by related magnets M10, M11, M12, M13, respectively. When a magnet is energized, the related clutch detent arm moves downward and the end of the clutch dog drops beyond the detent lug 167 of the detent arm, allowing the clutch dog to engage the related ratchet wheel 166. If the magnet is still energized when the clutch completes its revolution, the clutch dog strikes a contact 171 insulatedly mounted on the clutch detent arm by an insulating block 172.

Distributor

Figure 16:
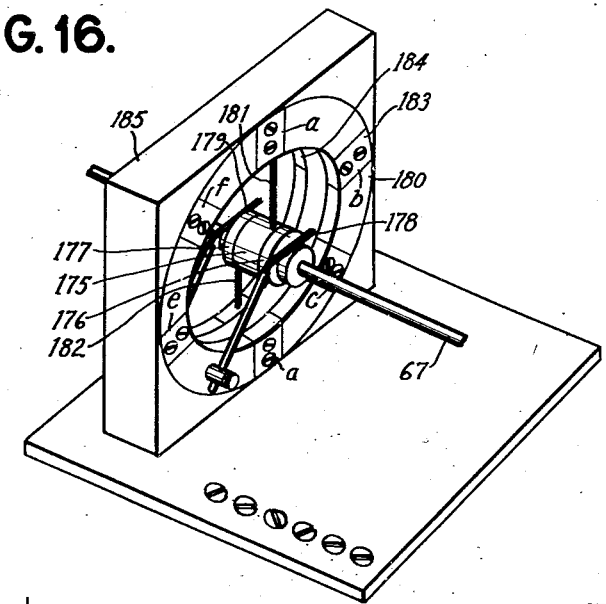
Fig. 16 is a perspective view of a part of the distributor used in the second embodiment of the invention.
Figure 17:
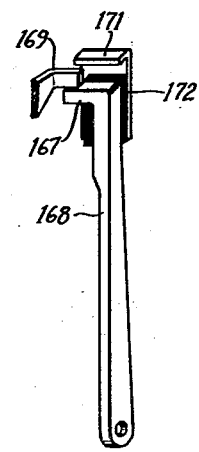
Fig. 17 is a detail view of one of the clutch control devices used in the second embodiment.

The driving and control means for the distributor used in the second embodiment is identical with the first embodiment, hence is not shown in Fig. 16. The difference lies in the double commutator in the second embodiment. On the distributor shaft 67 is an insulating head 175 on which are mounted two slip rings 176, 177. Two feeding brushes 178, 179 bear on the respective slip rings and are mounted in terminals, one of which appears at 180. Two brushes 181, 182 are inserted in drilled holes in the head 175 so as to make contact laterally with the flanges of the slip rings 176, 177, respectively. The ends of the brushes 181, 182 travel over two different sets of commutator segments 183, 184, held in an insulating block 185. The commutator segments 183 and 184 are identified individually by the letters $a, b, c, d, e, f$, to indicate the order in which the brushes 181, 182 make contact with them as the distributor shaft steps forward (see also Fig. 13).

Printer

Figure 12:
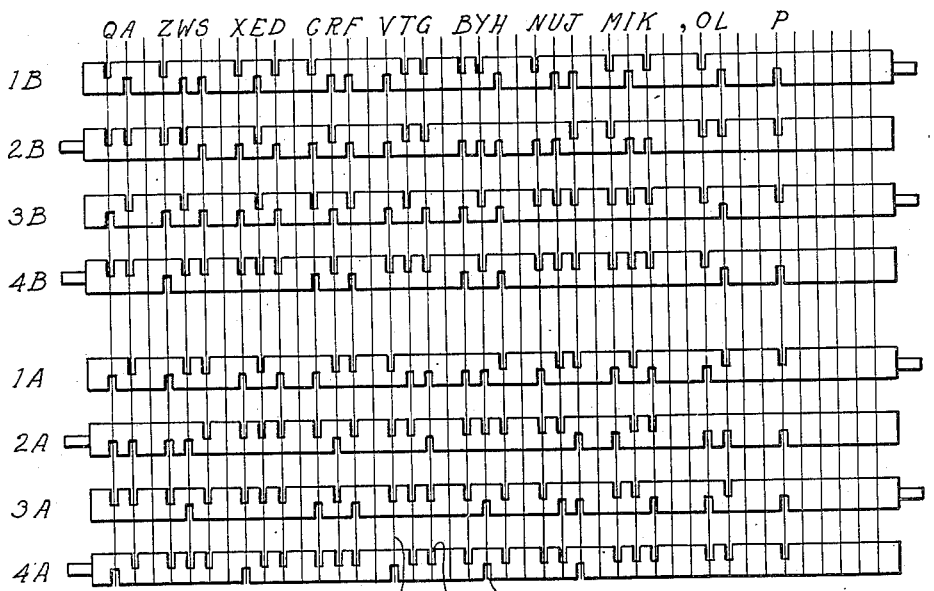
Fig. 12 is a diagram of a set of permutation bars for a printer forming part of a modified apparatus.

The printer used in the second embodiment is, in general, similar to the one used in the first embodiment, but has eight permutation bars, with appurtenant driving and control mechanisms, instead of six. This difference enables the signal elements to be stored directly in the permutation bar control means of the printer, dispensing with the translator. The eight permutation bars are shown in Fig. 12. The notches 186 on the top side of the bars are in position to let the related control lever 105 drop when the permutation bar remains stationary, while the notches 187 on the bottom side allow the control lever to drop when the permutation bar rotates. There are four bars 1B, 2B, 3B, and 4B, corresponding to dots, and four bars 1A, 2A, 3A, and 4A, corresponding to dashes. The numbers 1, 2, 3, 4 refer to the order of the signal elements, first signal element, second signal element, etc. For example, if the combination · · · — is received the bars 1B, 2B, 3B, and 4A will be revolved and the control lever 105 (Fig. 14) connected to the V key will be released. Due to the construction of the permutation bar control mechanism, previously described, the combination is first stored by releasing selected permutation bar clutches to preparatory position and releasing the selected clutches for simultaneous full rotation of their permutation bars, by operation of the print magnet.

Operation

The operation of the second embodiment will be understood best by following through the example shown in Fig. 4. When the switch 130 is closed, a circuit is established from the positive side of the line 131, contacts R9a in normal position, wire 132, magnet M11, to the negative wire 134, energizing said magnet and releasing the P clutch. In accordance with the example, the first marking signal component is received before the P clutch completes its revolution, breaking the circuit of magnet M11 at the contacts R9a and allowing the clutch detent lever 168 to return to normal position. The dog of the P clutch is therefore stopped by the lug 167. The closure of the contacts R9b when the first marking signal begins completes a circuit from the positive wire 131, through said contacts and magnet M10 to the negative wire 134, energizing said magnet. The clutch detent 168 moves down and releases the DD clutch dog, which engages the ratchet wheel 166 and the DD clutch starts to revolve. A commutator 190 connected to the DD clutch disk and grounded to the shaft 160 moves its conductive portion 191 under the brushes 192, 194, completing the following circuits: from the positive wire 131, through contacts R9b, relay RDD, brush 192, commutator segment 191, shaft 160, wire 193, to the negative wire 134; also, from the positive wire 131, through relay RFX and brush 194 to commutator segment 191 and wire 193 to the negative wire 134. The relays RDD and RFX being energized simultaneously, their contacts RDDx, y and RFXx, y transfer at the same time without establishing any circuit. The first signal component is a dot, hence the line relay R9 will be deenergized before the DD clutch completes its revolution, deenergizing the relay RDD. Contacts RDDx, y transfer back to normal position, completing the following circuits: from the positive wire 131, through contacts RDDx in normal position, contacts RFXx in transferred position, the stepping magnet MST and wire 195, to the negative wire 134, energizing said magnet; also, from the positive wire 131, through contacts RDDy in normal position, contacts RFXy in transferred position, wire 196, distributor brush 182, contact segment 184a, selector magnet M1B and wire 195 to negative wire 134, energizing said magnet. The energization of the stepping magnet MST causes brushes 181, 182 to step forward on the first segments 183a, 184a but without leaving said segments. The energization of the magnet M1B releases the clutch 117 pertaining to the permutation bar 1B, to preparatory position. When the DD clutch completes its revolution, the brush 194 rides on to an insulating strip 197 on the commutator 190, breaking the circuit of relay RFX, which becomes deenergized.

Contacts RFXx, y transfer to normal position, breaking the circuits of the stepping magnet MST and the selector magnet M1B. The selector clutch pertaining to the magnet M1B remains tripped, however, so that the clutch will be fully released upon energization of the print magnet, in a manner to be described. The deenergization of magnet MST allows the brushes 181, 182 to step to the second segments 183b, 184b. At the end of the first marking signal component, the line relay R9 was deenergized and the contacts R9a closed. A circuit was thereby completed through magnet M11, which became energized and released the P clutch. This clutch started on its revolution, but before the revolution was completed, the second marking signal component was received, breaking the contacts R9a and deenergizing the magnet M11, so that the P clutch dog 164 stopped against the lug 167.

The second marking signal, which causes the DD clutch to be released and the relay RDD and RFX to be energized as before, is a dash and therefore maintains the marking contacts R9b closed until after the clutch DD has completed its revolution. Therefore the detent arm 168 is held down by the magnet M10 and the dog 164 is stopped by the contact 171, completing a holding circuit for the relay RDD through wire 198, contact 171, dog 164, clutch disk 163, shaft 160, and wire 193 to the negative wire 134. The relay RFX is therefore deenergized before the relay RDD, completing the following circuits: from the positive wire 131, through the contacts RFXx in normal position, RDDx in transferred position, stepping magnet MST, wire 195 to the negative wire 134, energizing said magnet; also, through contacts RFXy in normal position, contacts RDDy in transferred position, wire 199, brush 181, contact segment 183b, magnet M2A, to wire 195 and the negative wire 134. Thus, a dash is stored and when the relay RDD is deenergized the circuit of the stepping magnet is broken and the deenergization of this magnet allows the brushes 181 and 182 to advance to the third distributor segments 183c, 184c. In a similar manner another dot is stored in the magnet M3B.

During the space following the third marking signal component, the magnet M11 remains energized until the P clutch has completed its revolution. The related dog 164 is therefore stopped by the contact 171, completing the following circuits: from the positive wire 131, through contacts R9a, wire 132, magnet M12, wire 200, contact 171, dog 164, clutch disk 163, shaft 160, wire 193, to the negative wire 134; also, from wires 132, 201, through magnets MP and MH in parallel, and through wire 200 to the negative wire in the same way. The clutch S begins to revolve when the magnet M12 is energized, but before its revolution is completed the next marking signal component is received, breaking the contacts R9a and deenergizing the magnet M12, so that the clutch dog 164 of the S clutch stops against the detent lug 167. The energization of the homing magnet MH restores the brushes 181, 182 to home position. The energization of the print magnet MP releases the permutation bars 1B, 2A, 3B pertaining to those selector magnets M1B, M2A, M3B, which were energized. From the diagram, Fig. 12, it appears that the revolution of these three bars will present a complete line of notches to the control lever 105 pertaining to the R key, and only this lever will be operated.

In a similar way the storage of the fourth signal component, which is received after the printing of the character "r" in the manner described, causes the magnet M1B to be energized. This signal element is followed by a space of sufficient length to cause the print magnet MP to be operated again, and this time as shown by the diagram (Fig. 12) the lever pertaining to the character "e" will be operated. At the same time the magnet MP is energized to cause the character "e" to be printed, the magnet M12 is energized to release the S clutch. This time the spacing condition continues until the S clutch makes a complete revolution and strikes the contact 171. This completes circuits from the negative wire, wire 193, shafts 160, 161, S clutch disk 163, and the related dog 164, contact 171, thence branching through magnet MS, and through wire 202 and magnet M13, to wire 132, and through contacts R9a to the positive wire 131, energizing said magnets. The magnet MS operates the space bar of the printer (Fig. 14). The magnet M13 releases the CR clutch, which starts a revolution. In accordance with the example, the spacing condition continues until the CR clutch has made a complete revolution and its dog 164 strikes the contact 171, completing a circuit from wire 132, through the magnet MCR, contact 171, dog 164, clutch disk 163, shafts 161, 160, wire 193, to the negative wire 134, energizing said magnet. The magnet MCR operates the carriage return lever of the printer.

Shortly after the magnet MCR is energized, another marking signal is received, which breaks the contact R9a and drops out the magnets M11, M12, M13. The related clutch detents 168 all rise to normal position and the corresponding dogs 164 drop off the contacts 171 onto the detent lugs 167.

Speed regulation

The rate at which Morse code is transmitted will vary with the skill of the operator and with the transmitting conditions. However, the ratios of the length of the dot to the length of the dash and to the lengths of the various spaces remain fairly uniform. As previously stated, if the dot is taken as having a basic time value $t$, the dash has a time value $3t$. A space between signal elements representing a single letter has the value $t$, while a space between letters has the value $3t$, and a space between words $5t$. For the purpose of the present invention, a space having a length of $7t$ or more is allowed for carriage return.

In calculating rates of transmission in Morse code, it is customary to assign a length of $48t$ to the average word. At the rate of twenty words per minute, an intermediate standard rate, there would be $960t$ per minute.

The timing mechanism in accordance with the present invention includes a fixed time measuring device for establishing a length of time between the length of a dot and the length of a dash, for comparison with the incoming marking signals, to distinguish dots from dashes. This fixed time is determined by the time required for one revolution of the commutator 20. It must be longer than $1t$, the dot, but shorter than $2t$, in order to restore the relay RFX within the time of a $1t$ space following a dot. Consequently, the fixed time measured by the commutator 20 is conveniently made equal to $3/2t$. To conform to signals transmitted at the rate of $960t$ per minute the speed of revolution of the commutator 20, that is, of the shaft 10, should therefore be $960 \times 2/3 = 640$ R. P. M.

In an apparatus actually constructed, the motor 14 drove the shaft 10 at a speed of 675 R. P. M., or 11.25 revolutions per second. The length of the fixed time was thus established as .089 second, a length of time suitable for comparison with signals in which the length of $t$ is $\frac{2}{3} \times .089 = .060$ second. The length of one average word composed of signals having this basic time value is $.060 \times 48 = 2.88$ seconds, making a rate of $60/2.88 = 20.8$ words per minute.

Figure 18:
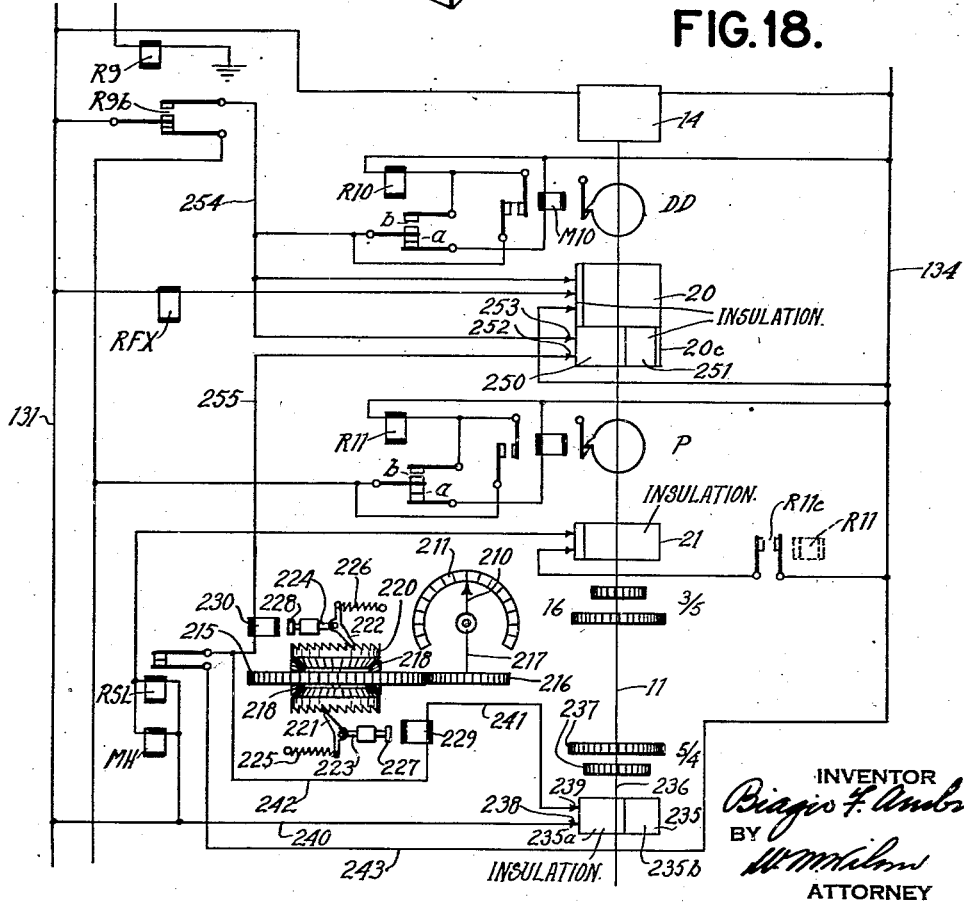
Fig. 18 is a diagrammatic view and circuit diagram of the speed regulating means.

The apparatus as described so far has a certain inherent tolerance for variations in the rate of transmission. The rate might be reduced until the length of the dot is almost $3/2t$ and dots would still be distinguished. On the other hand the rate might be increased until the length of the dash is only a little more than $3/2t$ and dashes would still be distinguished. The limits of the speed range are therefore from about 14 to 40 words per minute. However, it is preferred to maintain as wide a tolerance as possible and for this purpose, in accordance with another feature of the invention, means are provided to vary the speed of the motor 14 automatically, in response to the incoming signals, in order to vary the length of the basic time element $t$, to conform to the rate at which the signals are being sent. The means for accomplishing this automatic regulation is shown in Fig. 18, where the showing is reduced to those parts of the apparatus previously described, which are directly related to the speed regulating means.

The motor 14 is of the type having a governor controlled speed regulator, which can be adjusted by means of an arm 210 movable over a scale 211. The position of the arm 210 is controlled by a differential gear comprising a cage 215 having gear teeth meshing with a gear 216 fixed to the shaft 217 on which the arm 210 is fixed. Planet gears 218 journaled on the cage 215 mesh with sun gears 219 and 220. The gears 219 and 220 have ratchet teeth with which dogs 221 and 222 coact. The dogs are pivotally mounted on sliding shafts 223 and 224 and are pulled forward by springs 225 and 226. The ends of the shafts 223 and 224 carry armatures 227 and 228 with which are associated electromagnets 229 and 230. If these electromagnets are energized intermittently at the same rate, they will feed the sun wheels 219 and 220 at a uniform rate and the cage 215 will remain stationary and hold the arm 210 of the speed regulator at a fixed position. If the electromagnet 229 is energized at a more rapid rate than the electromagnet 230, the arm will be moved clockwise, the direction to reduce the speed of the motor 14. If the electromagnet 230 is energized at a more rapid rate, the reverse action will take place.

The energization of the electromagnet 229 is controlled by a commutator 235 on a shaft 236 connected through gears 237 to the shaft 11. The shaft 11 is driven by shaft 10 through gears 16 and the shaft 10 is driven by the drive shaft of motor 14. The ratios of the various gears are such, that with the motor operating at its normal speed the shaft 10 turns at 675 R. P. M., the shaft 11 turns at 405 R. P. M., and the shaft 236 at 506 R. P. M. The commutator 235 has a segment of insulation 235a and a conductive segment 235b. As conductive segment 235b makes contact with the brushes 238 and 239, a circuit is completed from the positive wire 131 through wire 240, brush 238, conductive segment 235b, brush 239, wire 241, electromagnet 229, wire 242, normally closed contacts RSLb and wire 243, to the negative wire 134, energizing said magnet 229 and pulling back the dog 221 over one tooth of the gear 219. When the insulating segment 235a moves under the brushes 238, 239, the magnet 229 is deenergized and the dog 221 feeds the gear 219 forward. This occurs 506 times per minute when the motor is running at its normal speed.

The dot-dash commutator 29 has an added section 29c, with a conductive segment 250 extending through about 240° of its circumference and a non-conductive segment 251 extending through the remaining 120°. In the latched position of the DD clutch the conductive segment 250 lies under brushes 252 and 253. When a dot signal is received by the relay R9, and the contacts R9b close, a circuit is extended from the wire 131, through said contacts R9b, wire 254, brush 253, segment 250, brush 252, wire 255, electromagnet 230, normally closed contacts RSLb and wire 243, to the negative wire 134, energizing said electromagnet and drawing the dog 222 back over one tooth of the gear 220. At the same time the DD clutch is released in the manner previously described and the commutator 29, begins to rotate. After about 120° of rotation, the brushes 252, 253 move onto the insulating segment 251, breaking the circuit of magnet 230 and allowing the dog 222 to feed the gear 220 forward. Before the insulating segment 251 passes the brushes 252, 253, the dot signal will have ended, if the signaling speed is not too far below the normal speed of 20 words per minute, and the circuit of the electromagnet 230 will be opened at the contacts R9b. If the signal had been a dash instead of a dot, the contacts R9b would have been still closed when the insulating segment 251 passed beyond the brushes 252, 253, and the magnet 230 would have been energized again before the DD clutch latched up at the end of one revolution. Then, when the dash signal terminated and the contacts R9b finally opened, the relay magnet 230 would have been deenergized again and a second step of movement would have been imparted to the gear 220.

Summarizing the operation of the electromagnet 230, a dot causes it to operate once while a dash causes it to operate twice. This conforms to the time ratio of a dot plus the following space, which equals $2t$, and a dash plus the following space, which equals $4t$. At the rate of 20.8 words per minute, the number of $t$ elements per minute will be $20.8 \times 48$ or approximately 1,000. The number of pulses of the magnet 230 (one for every $2t$) will be $1000 \div 2 = 500$. Since this is slightly less than 506 pulses given the magnet 229, at the normal speed of rotation of the motor the arm 210 of the speed regulator will move slightly clockwise, thus slightly reducing the speed of the motor. When the speed regulator is set for a rate of transmission of about 20 words per minute the speed regulating mechanism is capable of responding to any rate of transmission between about 15 and 30 words per minute and automatically adjusting the speed of the timing shafts, to reestablish the normal tolerance. When the speed regulator is in a different position the range of rates to which it will automatically respond it correspondingly shifted, so that the total range is limited only by the speed range of the motor 14. With the scale 211 calibrated in words per minute a direct reading of the rates of transmission is indicated.

The rates of marking and spacing time upon which the speed regulation is based occur only during the successive reception of the signal elements constituting a single letter, consequently means are provided to disable the circuits of the stepping magnets 229 and 230 during any space of greater length than $3/2t$. For this purpose the circuits of magnets 229 and 230 pass through normally closed contacts RSLb, which are opened by the relay RSL when a spacing condition lasts through a full revolution of the commutator 21, as previously described. During such spacing time the arm 210 will retain the setting it had when the relay RSL was energized.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a telegraph receiver of the dot-dash code type, a relay responsive to code signals and having normally open marking contacts closed on response of said relay to a marking signal condition, continuously ready timing means adapted, when started, to execute a timed control function of fixed duration longer than a dot signal and shorter than a dash signal, means operated upon closure of said marking contacts to start said timing means to initiate a comparison time starting approximately simultaneously with the start of a marking signal, and selective control means operable in different ways in dependence upon whether said marking contacts open before or after said timing means completes its control function, said selective control means including an element controlled by said marking contacts and an element controlled by said timing means on completing its control function.

2. In a telegraph receiver of the dot-dash code type, a relay responsive to code signals and having normally open marking contacts closed on response of said relay to a marking signal condition, continuously ready timing means adapted, when started, to execute a timed control function of fixed duration longer than a dot signal and shorter than a dash signal, means operated upon closure of said marking contacts to start said timing means to initiate a comparison time starting approximately simultaneously with the start of a marking signal, two printing control devices, and means controlling the selective energization of said devices, said last means including an element controlled by said marking contacts and an element controlled by said timing means.

3. In a telegraph receiver of the dot-dash code type, a relay responsive to code signals and having normally open marking contacts closed on response of said relay to a marking signal condition, continuously ready timing means adapted, when started, to execute a timed control function of fixed duration longer than a dot signal and shorter than a dash signal, means operated upon closure of said marking contacts to start said timing means to initiate a comparison time starting approximately simultaneously with the start of a marking signal, a plurality of pairs of printing control devices, distributing means for conditioning one pair at a time for selective operation, means controlling the selective energization of one of the conditioned pair of said devices, said last means including an element controlled by said marking contacts and an element controlled by said timing means on completing its control function, and means for shifting said distributing means to condition a different pair after each selective energization.

4. In a telegraph receiver of the dot-dash code type, a relay responsive to code signals and having normally open marking contacts closed on response of said relay to a marking signal condition and normally closed spacing contacts opened on response of said relay to a marking signal condition, a plurality of continuously ready timing means each adapted, when started, to execute a timed function of fixed duration, one of said timing means being for mark comparison and having a timed function longer than a dot signal and shorter than a dash signal, another of said timing means being for space comparison and having a timed function longer than the space between marking code elements of the same letter and shorter than the space between letters, means for starting said mark comparison timing means upon closure of said marking contacts, means for starting said space comparison timing means upon closure of said spacing contacts, printing means and control means therefor comprising a plurality of groups of selectively operable devices and means for rendering said groups subject to the control of said mark comparison timing means successively as successive signal elements of a single letter are received, the devices of each group being selectively operated in dependence upon whether said marking contacts open before or after said mark comparison timing means completes its timed function, and printing function control means rendered effective each time said spacing contacts remain closed until after said space comparison timing means completes its timed function, to cause said printing means to print a character determined by said selective control means.

5. In a telegraph receiver of the dot-dash code type, a printer having printing elements, selective control means therefor, printing function control means, and spacing function control means; a relay responsive to code signals and having normally open marking contacts and normally closed spacing contacts respectively closed and opened on response of said relay to a marking signal condition, a plurality of continuously ready timing means each adapted, when started, to execute a timed function of fixed duration, one of said timing means being for mark comparison and having a timed function longer than a dot signal and shorter than a dash signal, a second one of said timing means being for space comparison and having a timed function longer than the space between marking code elements of the same letter and the space between letters, a third one of said timing means being for space comparison and having a timed function which, when added to the timed function of said second timing means, makes a total time longer than the space between letters and shorter than the space between words, means operated upon closure of said marking contacts to start said first timing means, means subject to the joint control of said marking contacts and said first timing means for setting up said selective control means in accordance with the one or more marking code elements representing one letter, said printing function control means being subject to the joint control of said spacing contacts and said second timing means so as to cause a printing element selected by said selective control means to be operated whenever said spacing contacts remain closed until said second timing means completes its timed function, the starting of said third timing means being likewise subject to the joint control of said spacing contacts and said second timing means, so as to occur whenever said spacing contacts remain closed until said second timing means completes its timed function, and said spacing function control means being subject to the joint control of said third timing means and said spacing contacts, so as to be operated whenever said spacing contacts remain closed until said third timing means completes its timed function.

6. In a telegraph receiver of the dot-dash code type, a relay responsive to code signals and having normally open marking contacts closed on response of said relay to a marking signal condition, continuously ready timing means adapted, when started, to execute a timed control function of fixed duration longer than a dot signal and shorter than a dash signal, a dot-dash relay having an energizing circuit controlled by said marking contacts, a fixed time relay having an energizing circuit controlled by said timing means, printing means, and selective control means therefor jointly controlled by said dot-dash relay and said fixed time relay.

7. A telegraph receiver as described in claim 6, wherein said selective control means comprises a plurality of pairs of storage elements, and distributing means for subjecting said pairs in succession to the control of said dot-dash and fixed time relays, as successive marking code elements of a letter are received by said receiving relay.

8. A telegraph receiver as described in claim 6, wherein said selective control means comprises a plurality of pairs of storage elements, and distributing means for subjecting said pairs in succession to the control of said dot-dash and fixed time relays, as successive marking code elements of a letter are received by said receiving relay, a second continuously ready timing means adapted, when started, to execute a timed control function of fixed duration longer than the space between marking code elements of a single letter and shorter than the space between letters, said receiving relay having normally closed spacing contacts opened on response of said receiving relay to a marking signal condition, printing function control means jointly controlled by said spacing contacts and said second timing means so as to operate said printing means, in accordance with the setting of said selective control means, whenever said spacing contacts remain closed until said second timing means completes its timed function, and homing means operated concurrently with said printing function control means to restore said distributing means to home position.

9. A telegraph receiver as described in claim 3, wherein said pairs of printing control devices are clutch magnets controlling the operation of respective permutation members of a printing mechanism having separate permutation members for dots and dashes in each of the successive signal element positions of the code.

10. In a telegraph receiver for receiving code of the dot-dash type, signal timing means including a shaft, a variable speed motor continuously driving said shaft, and a timing device operated by said shaft for distinguishing dots from dashes, two motor control means, one operated proportionally to the speed of said shaft, the other operated proportionally to the rate at which the signals are received, and means controlled jointly by said two motor control means for varying the speed of said motor.

11. In a telegraph receiver for receiving code of the dot-dash type, signal timing means including a shaft, a variable speed motor continuously driving said shaft, and a timing device operated by said shaft for distinguishing dots from dashes, two motor control means, one operated proportionally to the speed of said shaft, the other operated in response to incoming signals, the dash signals causing the latter to operate at a multiple of the rate caused by dot signals, and means controlled jointly by said two motor control means for varying the speed of said motor.

12. In a telegraph receiver for receiving code of the dot-dash type, signal timing means including a shaft, a variable speed motor continuously driving said shaft, and a timing device operated by said shaft for distinguishing dots from dashes, motor control means including a differential mechanism comprising three interconnected members, motor speed regulating means controlled by one of said members, two impulsing means acting oppositely upon the other two members, respectively, to maintain said first member stationary when said impulsing means operate at the same rate and to move said first member in one direction or the other when said impulsing means operate at different rates, means operated by said shaft for intermittently energizing one of said impulsing means as said shaft rotates, and means operated in dependence upon the incoming signals for intermittently energizing the other one of said impulsing means.

13. A telegraph receiver as described in claim 12, wherein said means operated in dependence upon the incoming signals energizes the related impulsing means in response to dash signals at a rate which is a multiple of the rate at which it energizes said impulsing means in response to dot signals.

14. In a telegraph receiver of the dot-dash code type, a relay responsive to code signals and having a contact device operated in one direction on response of said relay to a marking signal condition and in the other direction on response of said relay to a spacing signal condition, continuously ready timing means adapted, when started, to execute a timed control function of a substantially fixed duration longer than a dot signal and shorter than a dash signal, means controlled by said contact device and operated upon movement of the latter in said one direction, to start said timing means to initiate a comparison time starting approximately simultaneously with the start of a marking signal condition, dot control means controlled by said contact device and adapted to execute a dot determining operation on movement of the latter in said other direction before said timing means completes its timed control function, and dash control means comprising means controlled by said timing means adapted to execute a dash determining operation on completion of said timed control function before said contact device moves in said other direction.

BIAGIO F. AMBROSIO.